US007476005B2

(12) United States Patent
Tsuda et al.

(10) Patent No.: US 7,476,005 B2
(45) Date of Patent: Jan. 13, 2009

(54) VEHICLE HEADLAMP

(75) Inventors: Toshiaki Tsuda, Shizuoka (JP); Naoki Uchida, Shizuoka (JP); Yoichiro Domae, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/430,913

(22) Filed: May 10, 2006

(65) Prior Publication Data

US 2006/0262535 A1 Nov. 23, 2006

(30) Foreign Application Priority Data

May 18, 2005 (JP) .......................... P.2005-144891

(51) Int. Cl.
*B60Q 1/00* (2006.01)

(52) U.S. Cl. ........................ 362/263; 362/507; 362/538

(58) Field of Classification Search ................. 362/263, 362/216, 217, 260, 261, 310, 507, 519, 538, 362/548, 549; 313/493, 573, 634
See application file for complete search history.

(56) References Cited

U.S. PATENT DOCUMENTS

| | | | | |
|---|---|---|---|---|
| 5,957,570 | A * | 9/1999 | Ooyama et al. | 362/263 |
| 5,957,571 | A * | 9/1999 | Koster et al. | 362/306 |
| 6,586,881 | B1 * | 7/2003 | Miyazawa et al. | 313/634 |
| 6,791,267 | B2 * | 9/2004 | Niimi | 313/634 |
| 2005/0200282 | A1 * | 9/2005 | Lynn | 313/634 |

FOREIGN PATENT DOCUMENTS

JP 2001-76677 A 3/2001

* cited by examiner

*Primary Examiner*—Sharon E Payne
*Assistant Examiner*—Mary Zettl
(74) *Attorney, Agent, or Firm*—Sughrue Mion, PLLC

(57) ABSTRACT

A vehicle headlamp including a discharge bulb having a ceramic light emitting tube, the light emitting tube having opposed electrodes and being filled with a light emitting substance; and a reflector, which controls a reflection of a light emitted from the light emitting tube. A cross-sectional shape of the light emitting tube is longer in a lateral direction than in a vertical direction.

14 Claims, 9 Drawing Sheets

FIG. 11

| | LIGHT DISTRIBUTION FUNCTION | | | | | BULB FUNCTION |
|---|---|---|---|---|---|---|
| | REMOTE RECOGNIZABILITY | | COMMERCIAL PERFORMANCE | | | LIGHT EMITTING EFFICIENCY |
| | MAX LIGHT INTENSITY VALUE | MAX LIGHT INTENSITY POSITION | GLARE LIGHT (VICINITY OF CUT LINE) | NONUNIFORMITY IN COLOR OR LIGHT INTENSITY | YELLOW COLOR GLARE LIGHT | |
| TRIAL PRODUCT (EMBODIMENT 1) ELLIPSE OR OVAL (WIDTH 3mm, HEIGHT 2mm) | ◎ | ◎ | ◎ | ◎ | ◎ | ◎ |
| COMPARATIVE EXAMPLE 1 (WITH MERCURY) | ◎ | ◎ | △ | △ | △ | ○ |
| COMPARATIVE EXAMPLE 2 (MERCURY FREE) | ◎ | ◎ | △ | △ | △ | ○ |
| COMPARATIVE EXAMPLE 3 (TRUE CIRCLE 3.0mm $\phi$) | ◎ | △ | ○ | ◎ | ○ | ○ |
| COMPARATIVE EXAMPLE 4 (TRUE CIRCLE 2.0mm $\phi$) | △ | ◎ | ◎ | ○ | ◎ | △ |

VEHICLE HEADLAMP

The present invention claims foreign priority to Japanese patent application no. 2005-144891, filed on May 18, 2005, the content of which is incorporated herein by reference.

BACKGROUND OF THE INVENTION

1. Field of the Invention

The present invention relates to a vehicle headlamp provided with a discharge bulb having a ceramic light emitting tube. The light emitting tube has opposed electrodes and is filled with a light emitting substance.

2. Description of the Related Art

As shown in FIG. 13, a discharge bulb used as a light source of a vehicle headlamp includes an arc tube main body 1 formed by welding a shroud glass 4 to an arc tube 2 having a glass light emitting tube. The arc tube main body 1 is assembled to a synthetic resin insulating base 9 on a rear side thereof and is fixedly held thereby so that the arc tube 2 extends to a front side of the base 9. Specifically, a rear end side of the arc tube main body 1 is fixed to a front face side of the insulating base 9 by a metal piece 5, and a front end side of the arc tube main body 1 is supported by a lead support 6, which is also an electricity conducting path, extended from the insulating base 9.

The arc tube 2 includes a hermetically sealed glass sphere 2*a* filled with a light emitting substance (metal halide or the like) and a rare gas substantially at a center portion in a longitudinal direction of a glass tube. The end portions of the glass tube are sealed and include opposing electrodes. The arc tube 2 emits light by discharging electricity between the opposed electrodes. An outer side face of the shroud glass 4, which has a cylindrical shape and blocks UV light, is welded to the arc tube 2. The shroud glass 4 is provided with a light blocking film 7 for controlling a light distribution pattern of the arc tube 2. The discharge bulb forms a clear cutoff line by blocking a portion of light directed to an effective reflecting surface 8*a* of a reflector 8, thereby controlling light emitted from the arc tube 2.

However, the glass arc tube 2 (arc tube main body 1) poses a problem in that the filled metal halide causes glass tube to corrode. That is, the glass tube blackens and loses its transparency. Accordingly, the discharge bulb cannot achieve a proper light distribution pattern, and the service life of the glass tube is reduced.

Hence, as shown in FIG. 14, there has been proposed an arc tube 110 including a ceramic light emitting tube 120 (for example, see Japanese Patent Unexamined Publication JP-A-2001-76677, paragraph [0005] and FIG. 5). The arc tube 110 includes a ceramic, straight circular cylinder light emitting tube 120 that is sealed by cylindrical insulating members 130 at end portions 120*a*, 120*a* thereof, which form a hermetically sealed space filled with a light emitting substance and a rare gas. Electrodes 140, 140 are installed at opposing positions within the light emitting tube 120. The ceramic light emitting tube 120 is stable against the metal halide, and, therefore, the service life thereof is longer than that of a glass made arc tube.

However, the ceramic, straight cylinder type arc tube poses a problem in that its light distribution pattern has poor remote recognition because a hot zone of the pattern is considerably lower than the cutoff line.

That is, generally, a vehicle headlamp forms a dipped-beam (low-beam) light distribution pattern by using an effective reflecting surface that is provided at a position above the bulb. The effective reflecting surface is designed by projecting a light source images A, having rectangular shapes in correspondence with the light emitting tube 120, on a light distribution screen at a front side of the reflector with the rectangular shapes radially centering on a cutoff line/elbow portion. For example, a shape of the effective reflecting surface provided at a vicinity of a horizontal position in a left and right direction of the light emitting tube of the reflector is designed by projecting light along the cutoff line such that portions of light source images a contiguous in the lateral direction (direction along the cutoff line) and contiguous in a radial direction centering on the elbow portion overlap each other as shown by notations A, C in FIG. 15. The shape of the effective reflecting surface for forming left/right scattering light provided on an upper side of the effecting reflecting surface is designed by projecting light such that portions of the light source images a contiguous to each other in a lower direction or in a skewed direction constituting the radial direction centering on the elbow portion overlap each other as shown by notation B in FIG. 15. Further, the light distribution pattern shown in FIG. 15 is a light distribution pattern for a reflecting surface constituted by a paraboloid of revolution. Actually, light distribution patterns A1, B1, C1 having predetermined shapes without nonuniformities in light distributions as shown in FIG. 16 are formed by scattering the light source images a in a predetermined direction (mainly left and right direction) by forming a scattering step or the like at the reflecting surface.

However, a maximum brightness portion a1, which corresponds to the discharge arc, is disposed substantially at a center of the rectangular light image a, which has a width w. Therefore, there is a limit in designing the effective reflecting surface of the reflector so that a light distribution pattern includes a hot zone Hz proximate to a position of the cutoff line CL. That is, the position of the hot zone Hz is liable to be lowered relative to the cutoff line CL, which causes the light distribution pattern to have poor remote recognizability.

Further, a discharge bulb for a vehicle headlamp should have an excellent rise of a light flux so that a predetermined light flux is produced immediately after lighting. Therefore, a discharge bulb having a ceramic light emitting tube of a straight cylinder type, which is currently developed and disclosed in JP-A-2001-76677 or the like, uses of a light emitting tube with a tube diameter that is comparatively small (a volume of the hermetically sealed space is small) in order to improve a characteristic of rise of a light flux.

Therefore, the light source image a forming the light distribution pattern designated by notation B (B1) (that is, the light source image a projected radially in a lower direction or a skewed direction centering on the elbow portion) are rectangular shapes having a width that is not large because the diameter of the light emitting tube 120 is not large. Accordingly, the overlapping regions of the light source images a contiguous to each other near the elbow portion are small. Thus, a nonuniformity in color or a nonuniformity in a light intensity is conspicuous in the light distribution pattern, which causes poor front recognizability.

SUMMARY OF THE INVENTION

According to a first aspect of the present invention, a vehicle headlamp includes a discharge bulb having a ceramic light emitting tube, the light emitting tube having opposed electrodes and being filled with a light emitting substance therein; and a reflector which controls a reflection of a light emitted from the light emitting tube. A cross-sectional shape of the light emitting tube is longer in a lateral direction than in a vertical direction.

Here, the cross-sectional shape of the light emitting tube signifies a section orthogonal to a longitudinal direction, and the laterally prolonged cross-sectional face of the light emitting tube signifies a shape in which an outer shape dimension in a lateral (i.e., left and right) direction of the cross-sectional shape of the light emitting tube is larger than an outer shape dimension in a vertical (i.e., up and down) direction.

Further, an outer shape dimension of the light emitting tube may be between 1.5 mm and 4.5 mm in lateral direction, and between 1.0 mm and 3.5 mm in a vertical direction.

The cross-sectional shape of the light emitting tube may, for example, be an ellipse, an oval or a semi-circle.

The above described "semi-circle" not only includes a semicircular shape constituting a base with a diameter passing through a center of a circle (the base may be either of an upper side one or a lower side one) but also includes semicircular shapes having bases with various different heights constituted by straight lines in parallel with a diameter passing through the center of the circle.

BRIEF DESCRIPTION OF THE DRAWINGS

FIG. 11 is a diagram showing a light distribution function and a bulb function of the exemplary embodiment of the invention in comparison with comparative examples;

DESCRIPTION OF EXEMPLARY EMBODIMENTS

Exemplary embodiments of the invention will be described below with reference to the drawings. FIG. 1 through FIG. 8 show a first exemplary embodiment of the invention.

A lamp body 80 of a vehicle headlamp is a vessel having an open front face side. The front face opening portion is integrated with a transparent front face cover 90 to form a lamp chamber S. A reflector 100 is contained within the lamp chambers. A discharge bulb VI is inserted into a bulb inserting hole 102 of the reflector 100 at a rear portion thereof. An inner side of the reflector 100 is formed with effective reflecting surfaces 101*a*, 101*b* of vapor-deposited with aluminum. The effective reflecting surfaces 101*a*, 101*b* are constituted by pluralities of steps (multiple reflecting surfaces) having different shaped curved faces that control the light distribution pattern. A predetermined light distribution pattern (refer to FIGS. 7, 8) is formed by reflecting light emitted from the bulb V1 from the reflector 100 (effective reflecting surfaces 101*a*, 101*b* thereof) to a front side of the headlamp.

Figure 1:
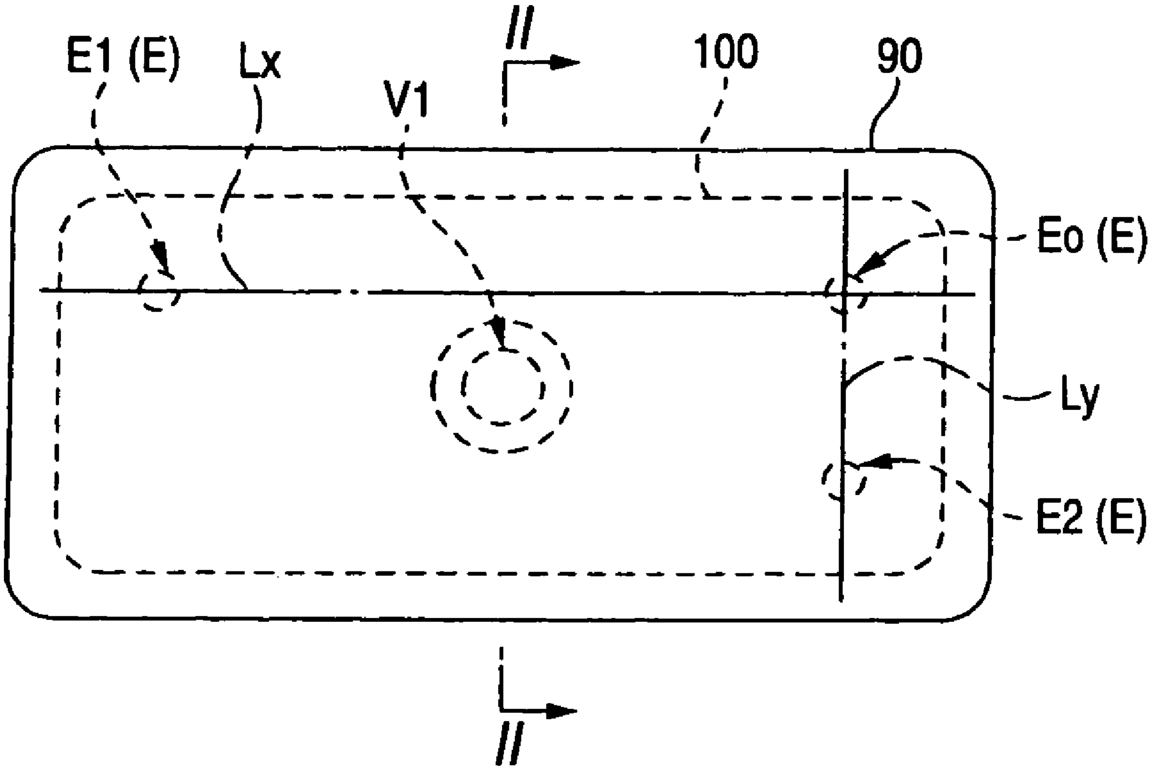
FIG. 1 is a front view of a headlamp for an automobile constituting a first exemplary embodiment of the invention.

Further, as shown in FIG. 1, the headlamp includes an aiming mechanism E constituted by an aiming fulcrum E0 having a ball joint structure and by two aiming screws E1, E2 that are interposed between the reflector 100 and the lamp body 80. The aiming screws E1, E2 are capable of inclining an optical axis L of the reflector 100 (headlamp) around a horizontal inclining axis Lx and a vertical inclining axis Ly, respectively (that is, the aiming adjusting axes for inclining the optical axis L of the headlamp).

Figure 2:
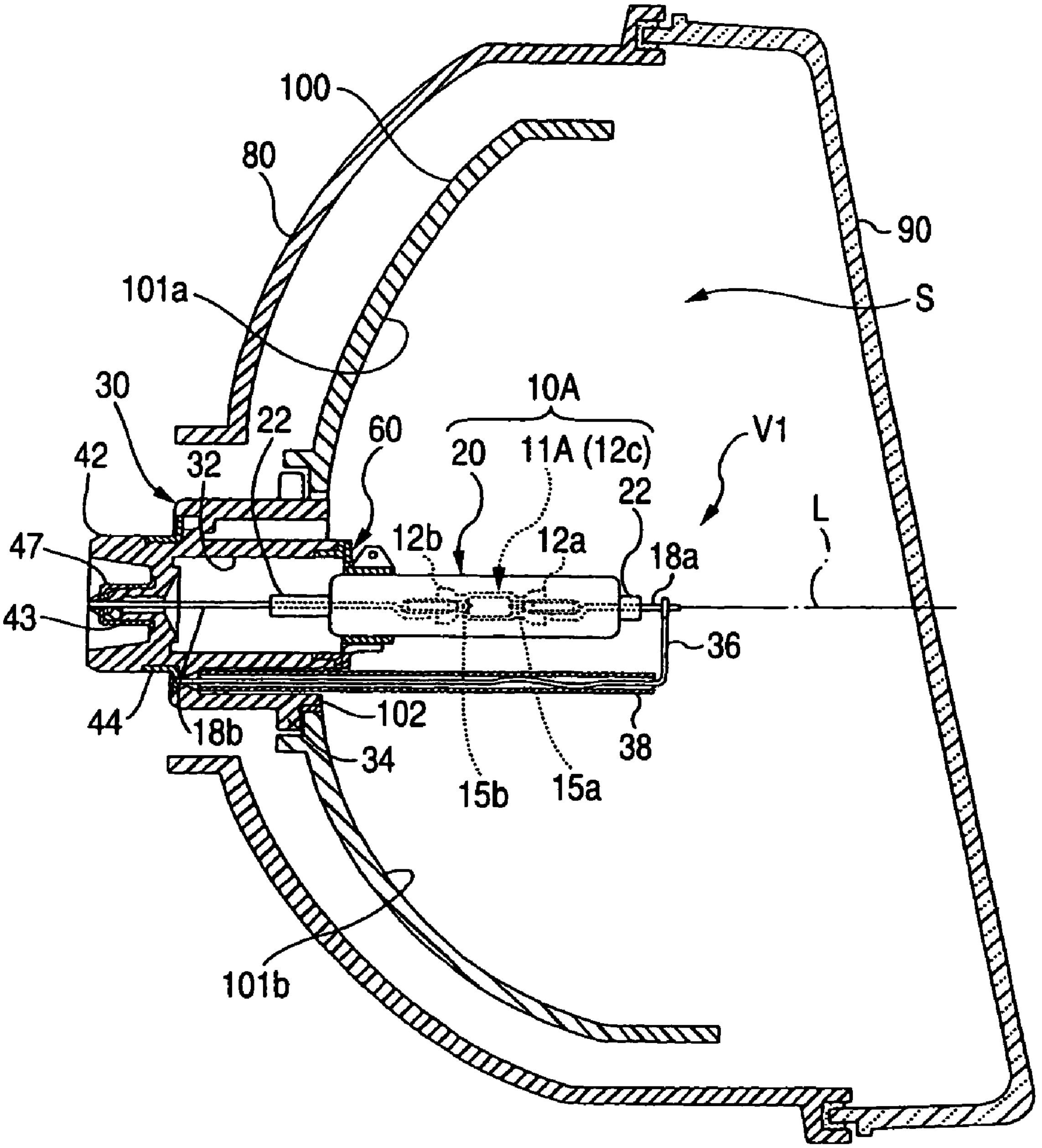
FIG. 2 is a vertical sectional view of the headlamp which is a sectional view taken along a line II-II shown in FIG. 1.

As shown in FIG. 2, the discharge bulb VI includes an insulating base 30, an arc tube 10A, a metal support 36, and a metal support member 60. The PPS resin insulating base 30 is provided with a focus ring 34, which is engaged with the bulb inserting hole 102 of the reflector 100 at an outer periphery thereof. On a front side of the insulating base 30, the arc tube 10A is fixedly supported by a metal lead support 36, which also constitutes an electricity conducting path, extended from the base 30 to a front side thereof. A metal support member 60 is fixed to a front face of the base 30.

A lead wire 18*a* is led out from a front end portion of the arc tube 10A to a front end portion of the lead support 36. The lead support 36 extends from the insulating base 30 and is bent so that the front end portion of the arc tube 10A is supported by the front end portion of the lead support 36. A lead wire 18*b* led out from a rear end portion of the arc tube 10A is connected to a terminal 47 provided at a rear end portion of the insulating base 30, and the rear end portion of the arc tube 10A is held by the metal support member 60.

A recess portion 32 is provided at a front end portion of the insulating base 30, and a rear end portion of the arc tube 10A is held inside the recess portion 32. A rear end portion of the insulating base 30, which extends to a rear side of the headlamp, includes a boss 43 in a shape of a cylindrical column surrounded by an outer cylinder portion 42 in a shape of a circular cylinder. An outer periphery of a root portion of the outer cylinder portion 42 is integrally fixed with a belt type terminal 44, which is in a shape of a circular cylinder and is connected to the lead support 36. The boss 43 is integrally adhered with a cap type terminal 47 that is connected with the rear end side lead line 18*b*.

The arc tube 10A includes a ceramic light emitting tube 11A integrated with a shroud glass 20. The ceramic light emitting tube has a hermetically sealed space s with opposed electrode rods 15*a*, 15*b*. The circular cylinder type shroud glass 20 blocks ultraviolet rays and covers the light emitting tube 11A. The lead wires 18*a*, 18*b* are electrically connected to the electrode rods 15*a*, 15*b* projected into the hermetically sealed space and are led out from front and rear end portions of the light emitting tube 11A. The lead wires 18*a*, 18*b* are sealed by pitch seals portions 22, which are reduced diameter portions of the shroud tube 20.

The light emitting tube 11A is constituted by a light transmitting ceramic. As shown in FIGS. 3 to 6, the light emitting tube 11A includes a center portion 12*c* interposed, in a longitudinal direction, between two thick-walled end cylindrical portions 12*a*, 12*b*. A cross-sectional shape of the center portion 12*c* is formed by a laterally elongated elliptical shape. The cross-sectional shapes of the cylindrical portions 12*a*, 12*b* are formed by true circles. The center portion 12*c* includes the hermetically sealed space s and opposed electrodes 15 (electrode rods 15*a*, 15*b*) provided within the space s. The space s is filled with a light emitting substance (mercury and metal halide) and a rare gas. Molybdenum pipes 14, 14 project from both end cylindrical portions 12*a*; 12*b* of the ceramic light emitting tube 11A and are bonded with the lead wires 18*a*, 18*b*, respectively. The light emitting tube 11A and the lead wires 18*a*, 18*b* extend coaxially.

Figure 3:
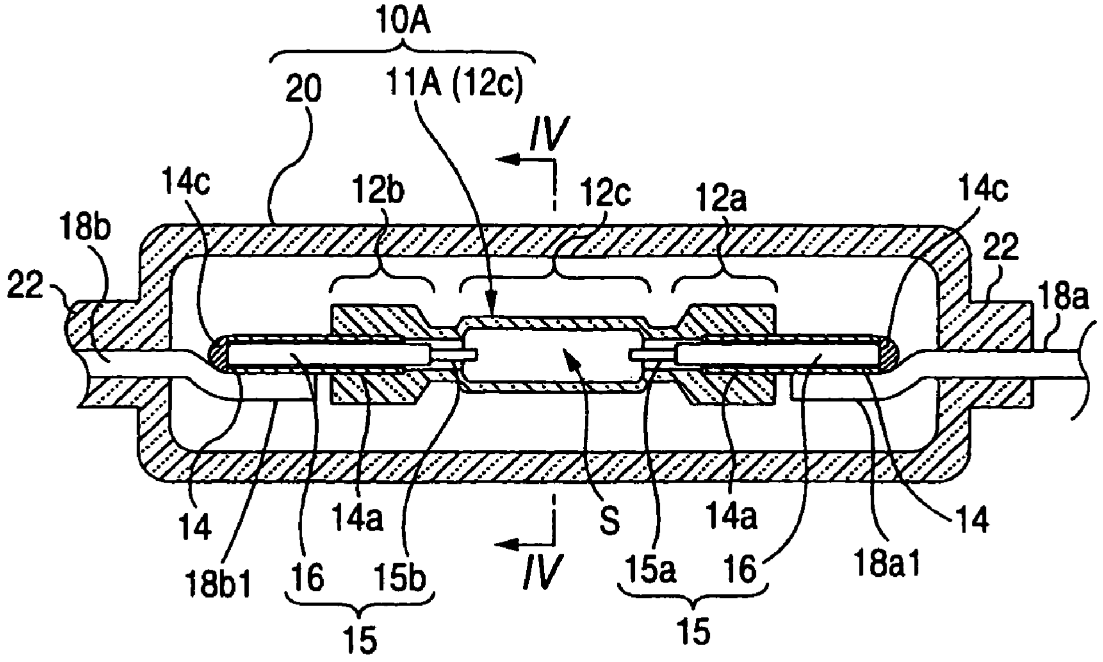
FIG. 3 is an enlarged vertical sectional view of the arc tube.
Figure 5A:
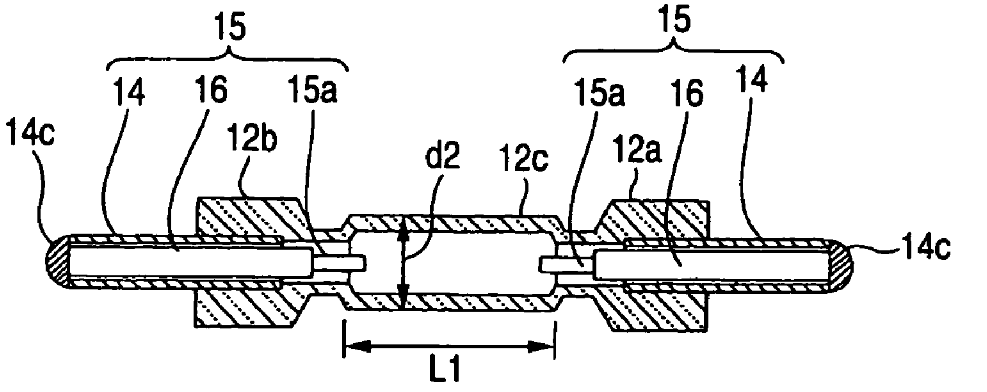
FIG. 5A is an enlarged vertical sectional view of the light emitting tube.
Figure 5B:
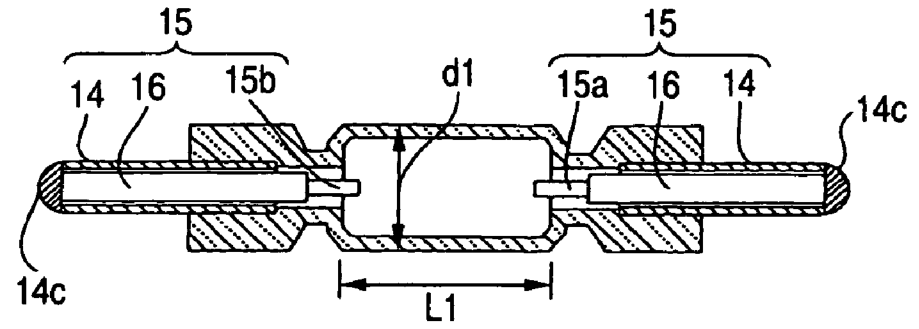
FIG. 5B is an enlarged horizontal sectional view of the light emitting tube.
Figure 6:
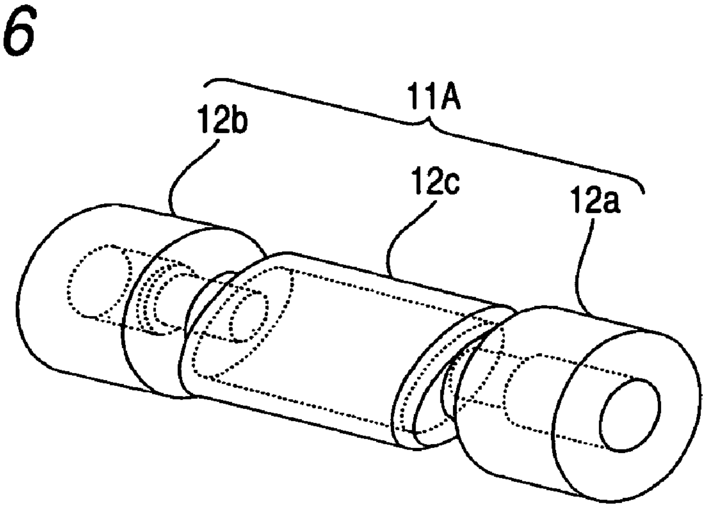
FIG. 6 is an enlarged perspective view of the light emitting tube.

The molybdenum pipes 14 are used for sealing both end cylindrical portions 12*a*, 12*b* of the light emitting tube 11A and for fixedly holding the electrodes 15, 1S. The molybdenum pipes 14 are formed so as to fit within a circular hole of the cylindrical portion 12*a* (12*b*), as shown in FIGS. 5A and 5B. A metallized layer 14*a* seals both end opening portions of the light emitting tube 11A by bonding inner peripheral faces of circular holes of the cylindrical portions 12*a*, 12*b* to outer peripheral faces of the molybdenum pipes 14. The electrodes 15 include molybdenum rods 16, 16 and the electrode rods 15*a*, 15*b*. The electrode rods 15*a*, 15*b* are bonded coaxially to the molybdenum rods 16, 16, which have a predetermined length and have an outer diameter slightly smaller than an inner diameter of the molybdenum pipe 14. End faces of the molybdenum rods 16 project outward from the molybdenum pipes 14. End faces of the molybdenum rods 16 inserted to the molybdenum pipes 14 are welded to end faces of the molybdenum pipes 14 by a laser welded portion 14*c*. Accordingly, the electrodes 15 are fixed to the light emitting tube 11A by the molybdenum pipes 14. Further, the molybdenum pipes 14 projected from front and rear ends of the light emitting tube 11A are fixed with bent, front end portions 18*a*1, 18*b*1 of the lead wires 18*a*, 18*b* made of molybdenum by welding. The lead wires 18*a*, 18*b* and the electrodes 15, 15 are coaxially arranged, as shown in FIG. 3.

That is, the cylindrical portions 12*a*, 12*b* at both ends of the light emitting tube 11A are fixed with the molybdenum pipes 14, which constitute closing members, by metallizing bonding. The molybdenum pipes 14 are welded with the molybdenum rods 16, 16, which are integrated to the electrode rods 15*a*, 15*b*, in order to seal the both end opening portions of the light emitting tube 11A. Further, the electrode rods 15*a*, 15*b* projected into the hertmetically sealed space s are constituted by tungsten excellent in heat resistance, and the molybdenum rod 16 of the electrode 15 and the molybdenum pipe 14 with which the rod 16 is bonded are made of the same kind of metal. Therefore, the construction satisfies both heat resistance at the charge light emitting portion 12*c* at a center in the longitudinal direction of the light emitting tube 11A and airtightness in the cylindrical portions 12*a*, 12*b*.

Further, because the ceramic light emitting tube 11A is an opalescent color and provides diffusion of emitted light; a difference in brightness or color is smoothed to some degree, and the discharge light emitting portion 12*c* emits light substantially uniformly.

Figure 4:
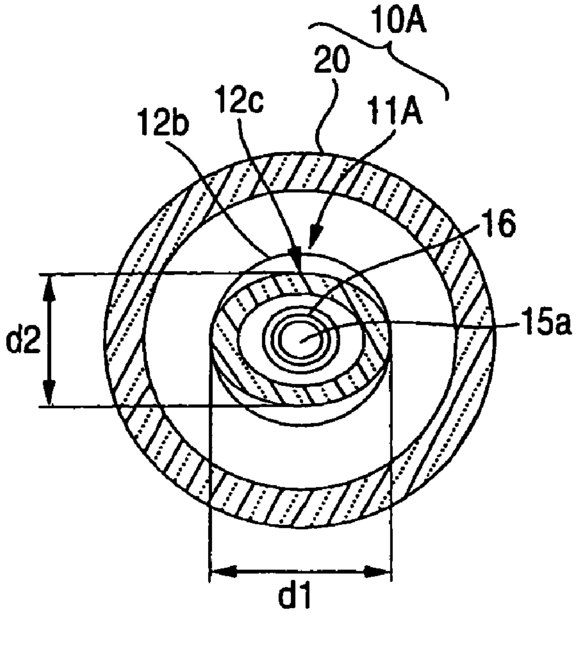
FIG. 4 is a cross-sectional view of the arc tube which is a sectional view taken along a line IV-IV shown in FIG. 3.

Further, a distance between the electrode rods 15*a*, 15*b* is set to 3 through 5 mm based on a starting characteristic and an electric property of a discharge bulb for a vehicle. A cross-sectional shape of the discharge light emitting portion 12*c* is a laterally elongated elliptical shape having an outer shape dimension d1 in a lateral direction (left and right direction) of 1.5 through 4.5 mm and an outer shape dimension d2 in a vertical direction (up and down direction) of 1.0 through 3.5 mm, as shown in FIG. 4. This allows the light emitting tube to make any nonuniformity in color and any nonuniformity in a light intensity in light distribution on the front side of the vehicle inconspicuous. Further, a thickness of a tube wall of the discharge light emitting portion 12*c* is set to 0.4 through 0.6 mm in order to reduce a heat capacity thereof.

That is, when the outer shape dimension d1 in the lateral direction of the cross-sectional face of the discharge light emitting portion 12*c* exceeds 4.5 mm, a tube wall load ($W/cm^2$) is reduced, and a light emitting efficiency of the light emitting tube 11A is reduced by an amount of increasing a surface area of the discharge light emitting portion 12*c*. When the outer shape dimension d2 in the vertical direction exceeds 3.5 mm, the rectangular light source image for illuminating regions along the cutoff lines CL, CLH becomes bold, and a light emitting characteristic is deteriorated such that the hot zone position is liable to be lowered from the cutoff line position. Therefore, it is preferable that the outer shape dimension d1 in the lateral direction of the cross-sectional face of the discharge light emitting portion 12*c* is equal to or smaller than 4.5 mm and the outer shape dimension d2 in the vertical direction is equal to or smaller than 3.5 mm.

Further, when the outer shape dimension d1 in the lateral direction of the cross-sectional face of the discharge light emitting portion 12*c* is less than 1.5 mm, a nonuniformity in color or a nonuniformity in a light intensity in light distribution on the front side of the vehicle becomes conspicuous. Moreover, when the outer shape dimension d2 in the vertical direction is less than 1.0 mm, arc generated between the electrodes 15, 15 is brought into contact with a tube wall, there is a problem in the durability (heat resistant impact strength) of the discharge light emitting portion 12*c*. Therefore, it is preferable that the outer shape dimension d1 in the lateral direction (vertical direction) of the cross-sectional face of the discharge light emitting portion 12*c* is equal to or larger than 1.5 mm and the outer shape dimension in the vertical direction is equal to or larger than 1.0 mm.

Further, when a length L1 (refer to FIG. 5) of the discharge light emitting portion 12*c* is excessively short (equal to or smaller than 6.0 mm), a light distribution amount on a right front side of the vehicle becomes deficient. In contrast, when the length L1 of the discharge light emitting portion 12*c* is excessively long (equal to or larger than 14.0 mm), a coldest point temperature at the root portion of the electrode rod is lowered, the light emitting efficiency is lowered, and light flux having 2000 lumens or more cannot be provided. Further, when the light emitting tube 11A (discharge light emitting portion 12*c*) is provided with a light blocking film for forming predetermined light distribution and the length L1 of the discharge light emitting portion 12*c* is equal to or smaller than 6.0 mm, the light distribution amount becomes deficient. In contrast, when the light emitting tube 11A is provided with a light blocking film for forming predetermined light distribution and the length L1 of the discharge light emitting portion 12*c* is equal to or larger than 14.0 mm, light glare is increased. Therefore, it is preferable that the length L1 of the discharge light emitting portion 12*c* falls in a range of 6.0 through 14.0 mm. According to the exemplary embodiment is further preferable that the length L1 falls in a range of 8.0 through 12.0 mm.

Further, when the light emitting tube 11A is made very compactly so that a volume of the hermetically sealed space s inside of the discharge light emitting portion 12*c* is as small as 5 through 30 μl, the hermetically sealed space reaches a high temperature immediately after starting discharge, and therefore, arise of a light flux is excellent. Further, because a surface area of the discharge light emitting portion 12*c* is small, the tube wall load ($W/cm^2$) is increased, and also the light emitting efficiency is excellent.

Figure 7:
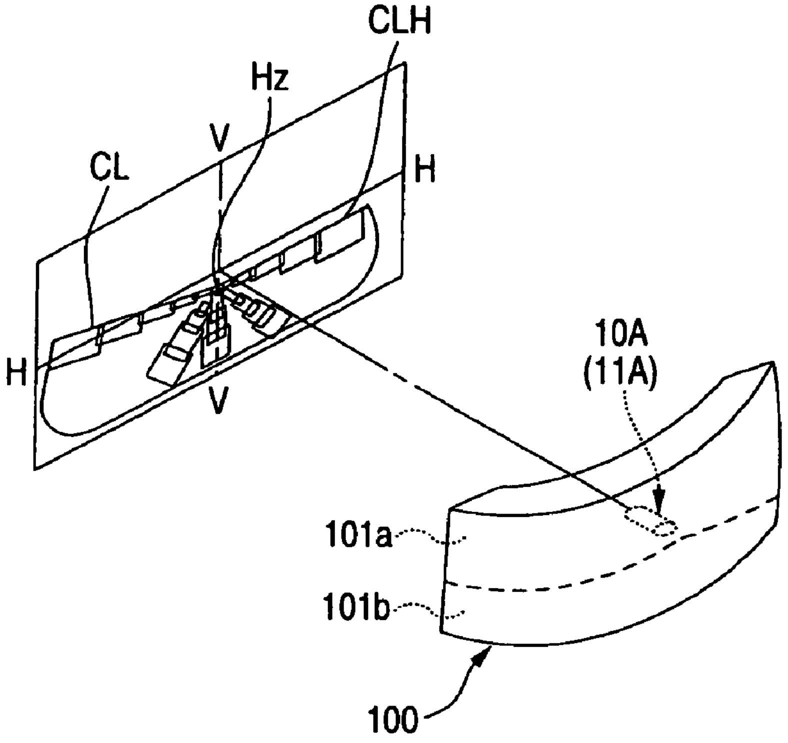
FIG. 7 is a perspective view showing a behavior when an effective reflecting surface of a reflector is designed.
Figure 8:
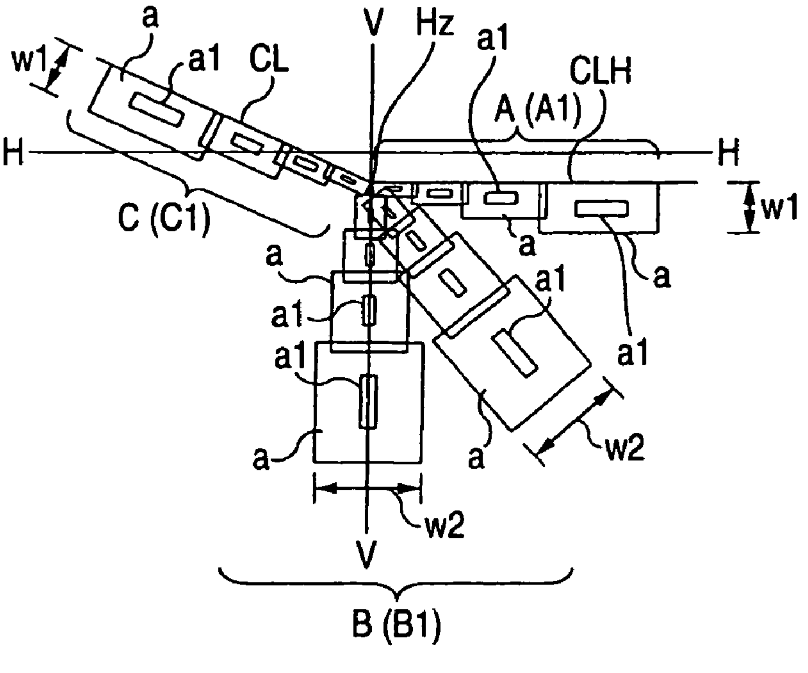
FIG. 8 is a view showing a light source image projected (pasted) to a light distribution screen when a light distribution of the reflector is designed.

Particularly, the molybdenum pipes 14 constituting the sealing portions 12*a*, 12*b*, the metallized layer 14*a* and the laser welded portion 14*c* are non-transparent members. Therefore, light is not leaked from the end portions 12*a*, 12*b* of the light emitting tube 11A, and the discharge light emitting portion 12*c* provides a light source image that is in the rectangular shape. As shown in FIG. 7, the effective reflecting surfaces 101*a*, 101*b* of the reflector 100, which provide the light distribution of the reflector 100, are designed based on the rectangular light source shape.

Next, a detailed explanation will be given of a light distribution formed by the headlamp according to the exemplary embodiment.

Figure 15:
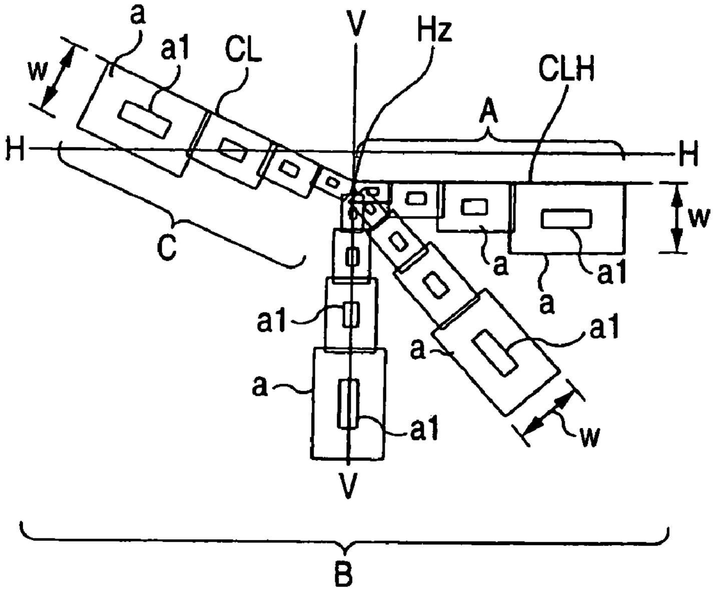
FIG. 15 is a view showing a light source image projected (pasted) to a light distribution screen.
Figure 16:
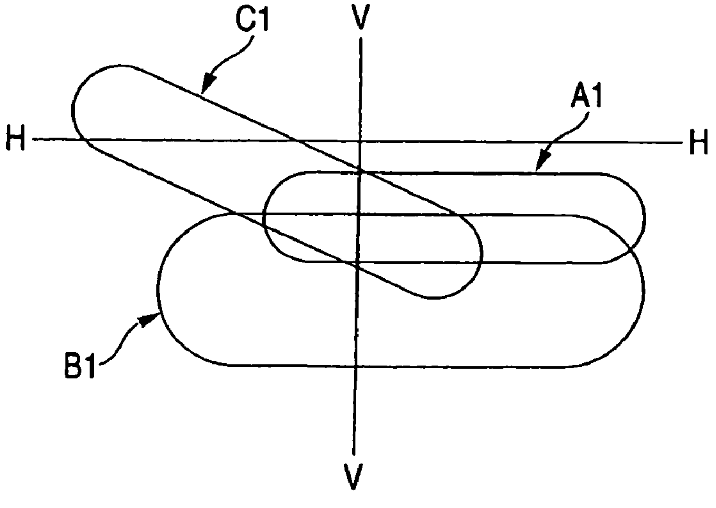
FIG. 16 is a view showing a light distribution pattern formed at the light distribution screen.

The effective reflecting surfaces 101*a*, 101*b* of the reflector 100 are designed by projecting the light source image a, which has a rectangular shape in correspondence with an outer shape of the light emitting tube 11A, onto a light distribution screen arranged on the front side of the reflector 100 and radially centered on the cutoff line/elbow portion, by providing the light emitting tube 11A (discharge light emitting portion 12*c*) with the cross-sectional shape (section orthogonal to the longitudinal direction) that is longer in the lateral direction that in the vertical direction. The following characteristics are achieved by the exemplary embodiment shown in FIG. 7 in comparison with the method of the related art shown in FIG. 15.

First, the rectangular light source images a, projected along the cutoff lines CL, CLH forming light distribution patterns A (A1), C (C1) along the cutoff lines CL, CLH, have a narrow width. That is, the size of the maximum brightness portions a1 (i.e., the portion of the image a in correspondence with arc generated between the electrode rods) of the rectangular light source images have a narrow width in comparison with a light emitting tube having a cross-sectional shape of a true circle. Comparing related art FIG. 15 with FIG. 8, the width w1 of the rectangular light source image of the exemplary embodiment is narrower than the width w of the related art that is, w1<w). Therefore, the light distribution pattern (i.e., the effective reflecting surfaces 101*a*, 101*b* of the reflector 100) can be designed so that the maximum brightness portion a1 is proximate to the cutoff lines CL, CLH. Thereby, the hot zone Hz of the light distribution is disposed at a position 0.5 through 1.5 D proximate to the cutoff lines CL, CLH.

Second, according to the rectangular light source images a projected in a radial shape in a lower direction or a skewed direction (i.e., other than the directions along the cutoff lines centering on the cutoff line/elbow portion) forming a light distribution pattern B (B1) at a region other than the regions along the cutoff lines CL, CLH, a region of overlapping between contiguous light source images a near to the elbow portion is increased because these light source images a are larger. Comparing related art FIG. 15 with FIG. 8, the width w2 of the exemplary embodiment is greater than the width w provided by the related art light emitting tube with a cross-sectional shape of a true circle. That is, by increasing the width w2 of the rectangular light source image a (w2>w) a difference in colors or light intensities between the respective light source images a is smoothed to form a light distribution in which a nonuniformity in color or a nonuniformity in a light intensity in the light distribution on the front side of the vehicle becomes inconspicuous.

Third, there is a concern that the metal halide constituting the light emitting substance filled in the light emitting tube 11A (i.e., in the discharge light emitting portion 12*c*) in an oversaturated state is stored at a bottom portion in the discharge light emitting portion 12*c*, which is the coldest portion of the light emitting portion 11A. When this happens, emitted light has a color of the metal halide (i.e., a yellow color). However, if the light emitting tube 11A (i.e., in the discharge light emitting portion 12*c*), with the cross-sectional shape greater in the lateral direction than the vertical direction, has the same volume as a light emitting tube having a cross-sectional shape of a true circle, the coldest portion of the light emitting tube 1A (discharge light emitting portion 12*c*) is moved to the lateral sides of both ends of the light emitting tube 11A (discharge light emitting portion 12*c*). By making the bottom portion of the light emitting tube 11A (discharge light emitting portion 12*c*) closer to the arc, it is difficult to store the metal halide directly below the space between the electrode rods 15*a*, 15*b*. Therefore, the yellow color emitted from the light emitting tube 11A (discharge light emitting portion 12*c*) is reduced.

In this way, first, the light distribution received by the headlamp of the exemplary embodiment has excellent remote recognizability because the hot zone is disposed at a vicinity of the cutoff line CL (position of 0.5 through 1.5D); second, the nonuniformity in color or the nonuniformity in the light intensity in the left and right scattering light distribution on the lower side of the cutoff line CL on the front side of the vehicle is inconspicuous; and, third, light emitted from the light emitting tube 11A is not influenced by a color (yellow color) of the metal halide, and the color becomes a white color, which is optimum for the headlamp.

Figure 9A:
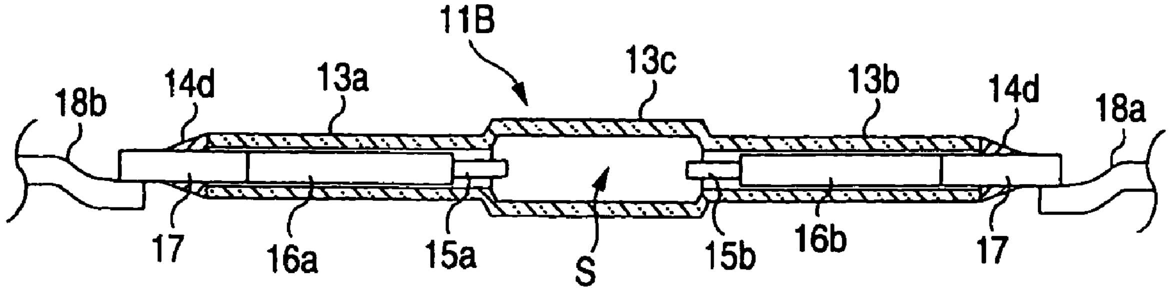
FIG. 9A is an enlarged vertical sectional view of the light emitting tube according to a second exemplary embodiment of the invention.
Figure 9B:
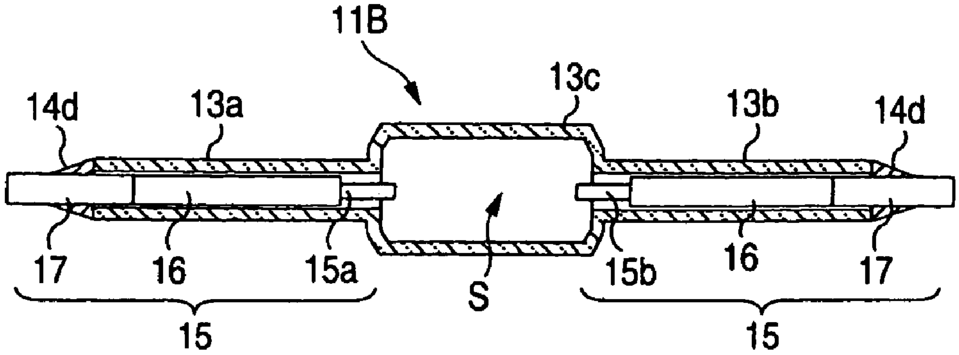
FIG. 9B is an enlarged horizontal sectional view of the light emitting tube according to the second exemplary embodiment of the invention.
Figure 10:
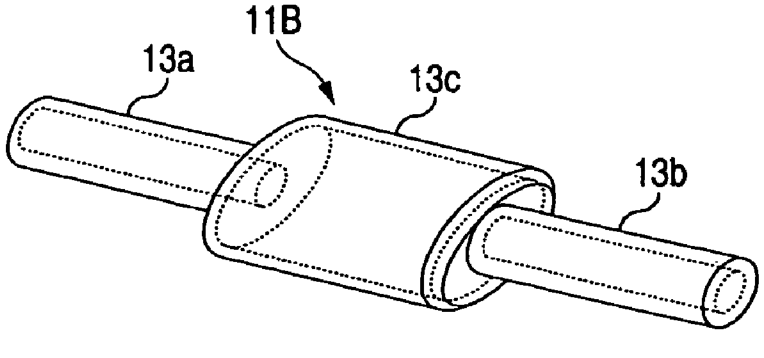
FIG. 10 is an enlarged perspective view of the light emitting tube according to the second exemplary embodiment of the invention.

FIGS. 9 and 10 show a second exemplary embodiment of the invention. In the first exemplary embodiment, both end cylindrical portions 12*a*, 12*b* of the ceramics made light emitting tube 11A are thick-walled. However, according to the second exemplary embodiment, both end cylindrical portions 13*a*, 13*b* of a light emitting tube 11B are longer than both end cylindrical portions 12*a*, 12*b* according to the first embodiment, and a thickness of both end cylindrical portions 13*a*, 13*b* is the same as a thickness of a wall of the discharge light emitting portion 13*c* (i.e., 0.4 through 0.6 mm). This thickness is the same as that of the discharge light emitting portion 12*c* of the first embodiment (cross-sectional shape in an elliptical shape). That is, the entire light emitting tube 11B is formed by substantially a uniform thickness.

Further, according to the first exemplary embodiment, the electrodes 15 include the electrode rods 15*a*, 15*b* and the molybdenum rods 16, and the electrodes 15, 15 are bonded to the light emitting tube 11A by the molybdenum pipes 14. However, according to the second exemplary embodiment, the electrodes 15 include the electrode rod 15*a*, 15*b*, the molybdenum rods 16, and niobium rods 17. The electrodes 15, 15 (i.e., the niobium rods 17) are bonded to the light emitting tube 11A by frit glass.

That is, the light emitting tube 11B includes the cylindrical portions 13*a*, 13*b* at both ends thereof. The ends are sealed by welding glass, referred to as frit seal, to provide the hermetically sealed space s inside of the discharge light emitting portion 13*c*, which includes opposed electrode rods 15*a*, 15*b* and is filled with the light emitting substance (mercury and metal halide) and the rare gas. The lead wires 18*a*, 18*b* are bonded to the niobium rods 17 projected from the circular cylinder portions 13*a*, 13*b* at both ends of the light emitting tube 11B, respectively, and the light emitting tube 11B and the lead wires 18*a*, 18*b* extend coaxially.

The electrode rods 15*a*, 15*b* are bonded to the molybdenum rods 16, 16 of a molybdenum rod/niobium rod bonded member of a predetermined length. The molybdenum rod/niobium rod bonded member has an outer diameter slightly smaller than the inner diameter of the circular holes of the cylindrical portions 13*a*, 13*b* of the light emitting tube 11B and is integrated therewith coaxially. The electrodes 15, 15 are fixed to the light emitting tube 11B by inserting the electrodes 15 (molybdenum rod/niobium rod bonded members) into the cylindrical portions 13*a*, 13*b*, with clearances therebetween, such that the electrode rods 15*a*, 15*b* are projected into the discharge light emitting portion 13*c* and then integrally bonding the niobium rods 17, 17 projected outward from the cylindrical portions 13*a*, 13*b* to end faces of the cylindrical portions 13*a*, 13*b* by glass welding (i.e., sealing).

That is, the niobium of the electrodes 15 is welded to the ceramic light emitting tube 11B by glass welded portions 14*d*. A thermal expansion coefficient of niobium is closer to the thermal expansion coefficient of ceramic than the thermal expansion coefficient of molybdenum is to that of ceramic. Therefore, an excessively large thermal stress is not produced by the glass welded portions 14*d*.

The other features of the second exemplary embodiment are the same as those of the first embodiment, and a duplicate explanation thereof will be omitted.

FIG. 11 is a diagram showing a comparison of the light distribution function and a bulb function of the headlamp according to the first exemplary embodiment with comparative examples.

In FIG. 11, a trial product is a headlamp having the structure of the first exemplary embodiment shown in FIGS. 1 through 8. That is, the cross-sectional shape of the discharge light emitting portion 12*c* of the ceramic light emitting tube 11A of the discharge bulb V1 has a laterally prolonged elliptical shape with an outer shape dimension in a lateral direction (left and right direction) of 3 mm and an outer shape dimension in a vertical direction (up and down direction) of 2 mm. On the other hand, comparative examples 1, 2 are headlamps of the related art using discharge bulbs having glass made light emitting tubes as light sources. Comparative example 1 is a headlamp using a discharge bulb having a specification of "with mercury" in which mercury is filled inside of the light emitting tube, and comparative example 2 is a headlamp using a discharge bulb having a specification of "mercury free" in which mercury is not filled inside of the light emitting tube. Comparative example 3 is a headlamp using a discharge bulb having a ceramic light emitting tube in a shape of a true circular cylinder with an outer diameter of 3 mm. Comparative example 4 is a headlamp using a discharge bulb having a ceramic light emitting tube in a shape of a true circular cylinder as a light source with an outer diameter of 2 mm.

As shown in FIG. 11, according to comparative examples 1, 2, in either specification of "with mercury" or "mercury free", when the headlamp of the related art includes the glass made light emitting tube, light at a vicinity of the cutoff line becomes glare light since the arc is bent. Further, there is a case in which a metal halide is liable to be stored at a bottom portion of the glass sphere of the discharge light emitting portion, which causes glare light of yellow color to be emitted or the like. Accordingly, the commercial performance of these headlamps can be improved.

Further, according to comparative example 3, that is, the headlamp constituting the light source by the ceramics made light emitting tube having a shape of the true circular cylinder with an outer diameter of 3 mm, as indicated in the related art, the hot zone position is liable to be lowered, which causes a difficulty in remote recognizability. Further, there is also a case in which a metal halide is stored at a bottom portion of the light emitting tube, and the emitted light has a yellowish color.

Further, according to comparative example 4, that is, a headlamp including the ceramic light emitting tube having the shape of the true circular cylinder in which the outer diameter is 2 mm, the light emitting tube and arc are frequently brought into contact with each other. Therefore, the heat loss is large, the light emitting efficiency and the MAX brightness are reduced, and a light intensity value of the hot zone does not reach a sufficient value. In addition, the nonuniformity in color and the nonuniformity in the light intensity become somewhat noticeable in the front side scattering light distribution; however, these are not as noticeable as those in comparative examples 1, 2.

In contrast to the comparative examples 1 through 4, according to the headlamp constituting the light source by the light emitting tube having the structure shown in the first exemplary embodiment shown in FIGS. 1 through 8, which is the trial product, the light intensity value of the hot zone is sufficiently large, the hot zone position is disposed at a vicinity of the cutoff line, and the headlamp has excellent remote recognizability. Further, glare light is not emitted by light at the vicinity of the cutoff line, the nonuniformity in color or the nonuniformity in the light intensity is not conspicuous in the light distribution, and yellow glare light is not emitted. Therefore, the headlamp has excellent commercial performance.

Further, according to the first exemplary embodiment, because the light emitting tube and arc rarely contact each other, heat loss is not increased, and the headlamp has excellent light emitting efficiency. Therefore, the function of the bulb is excellent.

Figure 12:
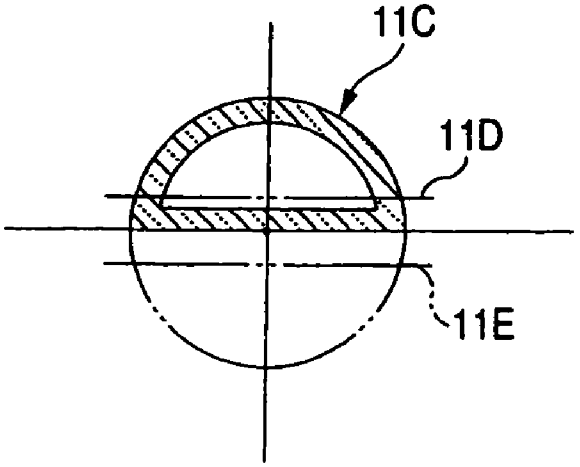
FIG. 12 is a cross-sectional view of a portion of the light emitting tube of another exemplary embodiment of the invention.
Figure 13:
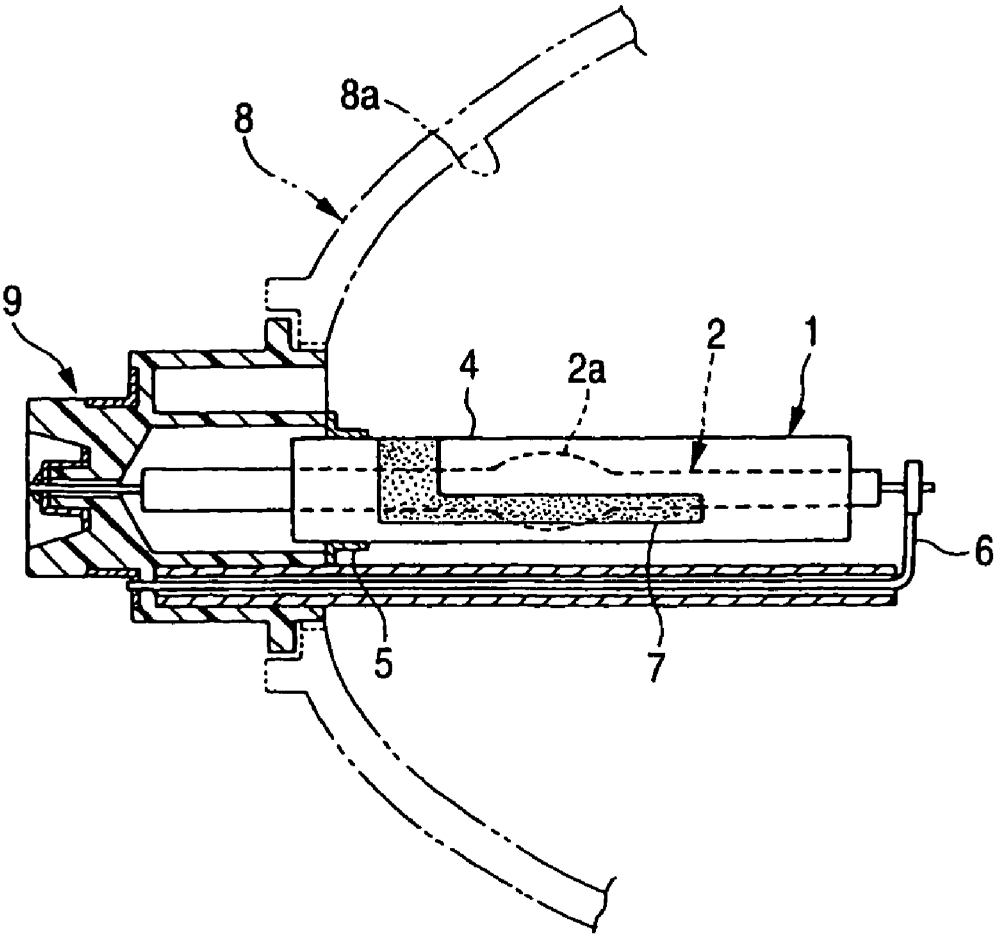
FIG. 13 is a vertical sectional view of a related art discharge bulb.
Figure 14:
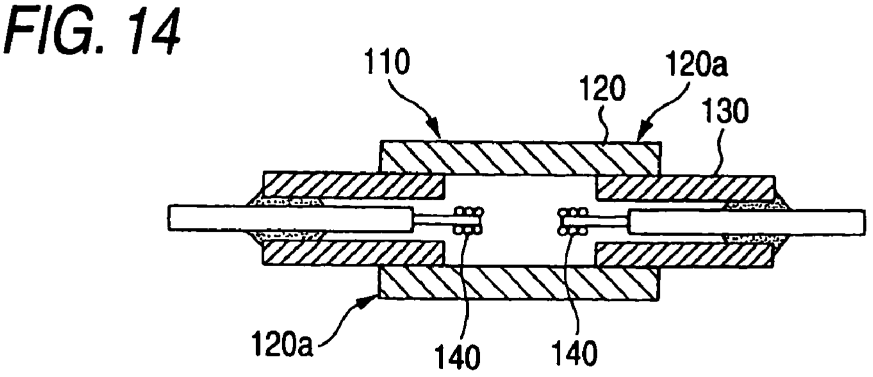
FIG. 14 is a vertical sectional view of a related art ceramic light emitting tube.

Further, although according to the above-described exemplary embodiments, an explanation has been given of the ceramic light emitting tube in which the cross-sectional face of the discharge light emitting portion includes a laterally elongated elliptical shape, the cross-sectional shape of the discharge light emitting portion of the light emitting tube may be constituted by, for example, a laterally elongated oval, or semi-circle. That is, as shown in FIG. 12, the cross-sectional shape 11C of the discharge light emitting portion can have a semicircular shape including a base with a diameter passing through a center of a circle. The base can be either on an upper side of the shape or on a lower side of the shape. In addition, the base of the semicircular shape may be formed by semicircular shapes having various different heights provided at straight lines that are parallel with the diameter passing through the center of the circle, as indicated by reference numerals 11D, 11E of FIG. 12.

According to the exemplary embodiments, a cross-sectional shape of the light emitting tube is a rounded shape, such as an ellipse, an oval, a semi-circle or the like. This is because, if a cross-sectional shape of the light emitting tube has an angular shape (such as, a rectangular shape or the like), there is a concern that a thermal stress concentrates on an angular portion to produce a crack. Therefore, for the rounded shapes of the exemplary embodiments, the entire light emitting tube is at a substantially uniform temperature, and a thermal stress is not concentrated to a portion thereof. Accordingly, these exemplary embodiments have excellent durability.

Further, although an explanation has been given of the discharge bulbs of the various exemplary embodiments in which the arc tube includes the ceramic light emitting tube integrated with the shroud glass, which surrounds the light emitting tube on the front side of the insulating base 30, the arc tube arranged on the front side of the base 30 may be a structure including only the ceramic light emitting tube and not including the shroud glass.

While the exemplary embodiments have been described in connection with the present invention, it will be obvious to those skilled in the art that various changes and modifications may be made therein without departing from the present invention. It is aimed, therefore, to cover in the appended claim all such changes and modifications as fall within the true spirit and scope of the present invention.

What is claimed is:

1. A vehicle headlamp comprising:

a discharge bulb including a ceramic light emitting tube, the light emitting tube including opposed electrodes and being filled with a light emitting substance; and a reflector, which controls a reflection of a light emitted from the light emitting tube;

wherein a cross-sectional shape of the light emitting tube is longer in a vehicle lateral direction than in a vehicle vertical direction, and wherein the vehicle lateral direction and the vehicle vertical direction are orthogonal to a longitudinal direction of the discharge bulb;

wherein the vehicle lateral direction and the vehicle vertical directions are with respect to an orientation of the vehicle.

2. The vehicle headlamp according to claim 1, wherein the light emitting tube including an intermediate portion with the opposed electrodes and being filled with the light emitting substance and circular cylindrical, wherein a cross-sectional shape of the intermediate portion is longer in the vehicle lateral direction than in the vehicle vertical direction, and wherein the intermediate portion is disposed between the circular cylindrical end portions.

3. The vehicle headlamp according to claim 2 wherein an outer shape dimension of the intermediate portion of the light emitting tube is between 1.5 mm and 4.5 mm in lateral direction, and between 1.0 mm and 3.5 mm in a vertical direction.

4. The vehicle headlamp according to claim 2 wherein the cross-sectional shape of the intermediate portion of the light emitting tube is an ellipse.

5. The vehicle headlamp according to claim 2 wherein the cross-sectional shape of the intermediate portion of the light emitting tube is a semi-circle.

6. The vehicle headlamp according to claim 2, wherein the cross-sectional shape of the intermediate portion of the light emitting tube is an oval.

7. A vehicle, comprising:

the vehicle headlamp according to claim 2.

8. The vehicle headlamp according to claim 1, wherein an outer shape dimension of the light emitting tube is between 1.5 mm and 4.5 mm in lateral direction, and between 1.0 mm and 3.5 mm in a vertical direction.

9. The discharge bulb for a vehicle headlamp according to claim 1, wherein the cross-sectional shape of the light emitting tube is an ellipse.

10. The vehicle headlamp according to claim 1, wherein the cross-sectional shape of the light emitting tube is a semi-circle.

11. The vehicle headlamp according to claim 1, wherein the cross-sectional shape of the light emitting tube is an oval.

12. A vehicle, comprising:

the vehicle headlamp according to claim 1.

13. The vehicle headlamp according to claim 1, wherein the reflector reflects the light emitted from the light emitting tube to form a light distribution pattern having a cutoff line at an upper end thereof.

14. The vehicle headlamp according to claim 1, wherein the discharge bulb further includes:

a circular cylindrical shroud glass covering the light emitting tube to block ultraviolet rays; and lead wires electrically coupled to the respective electrodes, wherein the shroud glass includes reduced diameter portions at front and rear end portions thereof, through which the respective lead wires are led out.

* * * * *